（12）United States Patent
Havlir et al.

(10) Patent No.: US 9,437,172 B2
(45) Date of Patent: Sep. 6, 2016

(54) HIGH-SPEED LOW-POWER ACCESS TO REGISTER FILES

(71) Applicant: Apple Inc., Cupertino, CA (US)

(72) Inventors: Andrew M. Havlir, Austin, TX (US); Michael A. Geary, Round Rock, TX (US); Robert Kenney, Austin, TX (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 14/463,271

(22) Filed: Aug. 19, 2014

(65) Prior Publication Data

US 2016/0055833 A1 Feb. 25, 2016

(51) Int. Cl.
*G09G 5/36* (2006.01)
*G06T 1/60* (2006.01)
*G09G 5/399* (2006.01)
*G09G 5/393* (2006.01)

(52) U.S. Cl.
CPC ............. *G09G 5/399* (2013.01); *G09G 5/393* (2013.01); *G06T 1/60* (2013.01); *G09G 2330/021* (2013.01)

(58) Field of Classification Search
None
See application file for complete search history.

(56) References Cited

U.S. PATENT DOCUMENTS

| 7,490,208 | B1* | 2/2009 | Yue | G06F 13/372 |
| | | | | 345/534 |
| 7,834,881 | B2* | 11/2010 | Liu | G06F 9/3012 |
| | | | | 345/505 |
| 8,564,604 | B2 | 10/2013 | Jiao | |
| 8,675,006 | B2 | 3/2014 | Ford et al. | |
| 9,032,165 | B1* | 5/2015 | Brooker | G06F 12/0806 |
| | | | | 711/154 |
| 2013/0024630 | A1* | 1/2013 | Campbell | G06F 9/522 |
| | | | | 711/146 |
| 2014/0055453 | A1 | 2/2014 | Maxim | |
| 2014/0176568 | A1 | 6/2014 | Bastos et al. | |
| 2014/0258627 | A1* | 9/2014 | Jackson | G06F 12/0875 |
| | | | | 711/125 |
| 2015/0113221 | A1* | 4/2015 | Hum | G06F 12/0871 |
| | | | | 711/125 |

\* cited by examiner

*Primary Examiner* — Jacinta M Crawford
(74) *Attorney, Agent, or Firm* — Meyertons, Hood, Kivlin, Kowert & Goetzel, P.C.

(57) ABSTRACT

Embodiments of a unified shading controller are disclosed. The embodiments may provide a first functional unit configured to send a write request to a second functional unit. The write request may include data and the data may include one or more control bits. Upon receiving the write request, the second functional unit may check the one or more control bits, and hold the data in a given queue dependent upon the control bits.

14 Claims, 6 Drawing Sheets

HIGH-SPEED LOW-POWER ACCESS TO REGISTER FILES

BACKGROUND

1. Technical Field

Embodiments described herein relate to computer processing and more specifically to register file access.

2. Description of the Related Art

Part of the operation of many computer systems, including portable digital devices such as mobile phones, notebook computers and the like, is the use of some type of display device, such as a liquid crystal display (LCD), to display images, video information/streams, and data. Accordingly, these systems typically incorporate functionality for generating images and data, including video information, which are subsequently output to the display device. Such devices typically include graphics processing units to process video and image information for subsequent display.

Graphics processing units (GPUs) typically operate on large amounts of graphics data in parallel using multiple execution pipelines or shaders. Modern GPUs are becoming more and more programmable, with less computation done in fixed-function hardware and more computation done using programmable shaders that execute graphics instructions from application developers. Execution of such instructions may consume considerable power, especially in more powerful GPUs.

SUMMARY OF THE EMBODIMENTS

Various embodiments of a unified shading cluster are disclosed. Broadly speaking, an apparatus and a method are contemplated in which a first functional unit may send a write request to a second functional unit. The write request may include data to be stored, and the data may include one or more control bits. The second functional unit may then check the control bits, and hold the data in one of a plurality of queues dependent upon the control bits.

In one embodiment, the second functional unit may be further configured to check a number of available entries in the one of the plurality of queues.

In a further embodiment, the second functional unit includes a register file. In response to a determination that the number of available entries is less than a threshold value, the second functional unit may be further configured to identify an oldest entry of a subset of the entries stored in the one of the plurality of queues. The control bits of each entry of the subset of entries indicate that the entry should be held in the queue.

BRIEF DESCRIPTION OF THE DRAWINGS

The following detailed description makes reference to the accompanying drawings, which are now briefly described.

Figure 1:
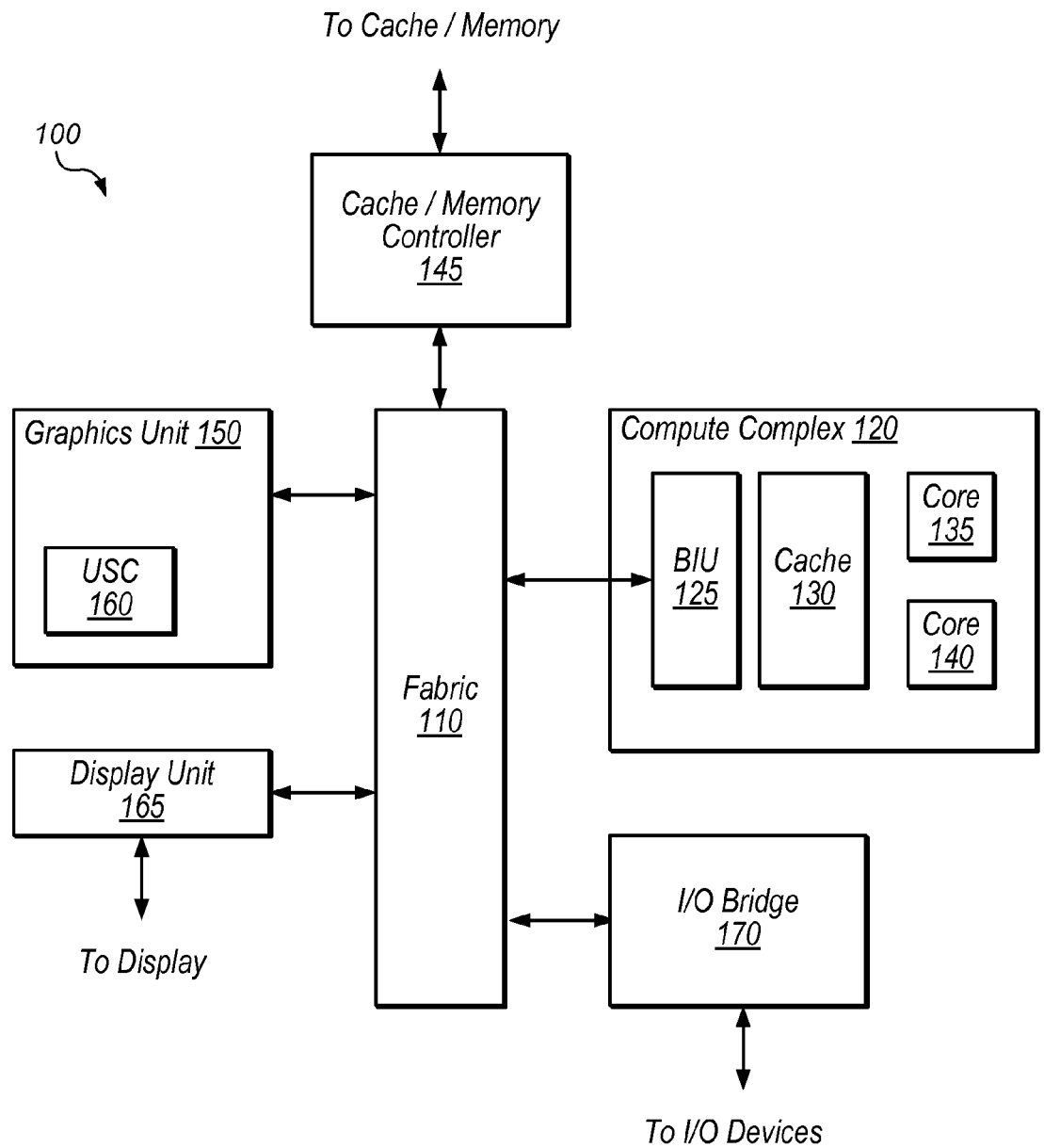
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

Graphics Processing Units (GPUs) may include multiple registers that may be used in various computations performed by shading units, such as, a vertex shader, for example. A data execution pipeline may read source operands from the registers, perform an operation using the source operands, and the write computed results back to the registers. Many such operations may be performed in parallel.

In addition to the data execution pipeline accessing the data stored in the registers, other agents may need to read from or write to the various registers. A queuing system may be employed to allow access requests from various agents to be serviced. The use of such queues may result in decreased performance and additional power consumption which may reduce battery life in mobile applications. The embodiments illustrated in the drawing and described below may provide techniques for providing high-speed access to the registers within a graphics system, while limiting the power consumed.

System Overview

Referring to FIG. 1, a block diagram illustrating an embodiment of a device 100 is shown. In some embodiments, elements of device 100 may be included within a system-on-a-chip (SoC). In some embodiments, device 100 may be included in a mobile device, which may be battery-powered. Therefore, power consumption by device 100 may be an important design consideration. In the illustrated embodiment, device 100 includes fabric 110, compute complex 120, input/output (I/O) bridge 170, cache/memory controller 145, graphics unit 150, and display unit 165.

Fabric 110 may include various interconnects, buses, multiplex circuits (commonly referred to as "MUX's"), controllers, etc., and may be configured to facilitate communication between various elements of device 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

In the illustrated embodiment, compute complex 120 includes bus interface unit (BIU) 125, cache 130, and cores 135 and 140. In various embodiments, compute complex 120 may include various numbers of cores and/or caches. For example, compute complex 120 may include 1, 2, or 4 processor cores, or any other suitable number. In one embodiment, cache 130 is a set associative L2 cache. In some embodiments, cores 135 and/or 140 may include internal instruction and/or data caches. In some embodiments, a coherency unit (not shown) in fabric 110, cache 130, or elsewhere in device 100 may be configured to maintain coherency between various caches of device 100. BIU 125 may be configured to manage communication between compute complex 120 and other elements of device 100. Processor cores such as cores 135 and 140 may be configured to execute instructions of a particular instruction set architecture (ISA) which may include operating system instructions and user application instructions.

Cache/memory controller 145 may be configured to manage transfer of data between fabric 110 and one or more caches and/or memories. For example, cache/memory controller 145 may be coupled to an L3 cache, which may in turn be coupled to a system memory. In other embodiments, cache/memory controller 145 may be directly coupled to a memory. In some embodiments, cache/memory controller 145 may include one or more internal caches.

As used herein, the term "coupled to" may indicate one or more connections between elements, and a coupling may include intervening elements. For example, in FIG. 1, graphics unit 150 may be described as "coupled to" a memory through fabric 110 and cache/memory controller 145. In contrast, in the illustrated embodiment of FIG. 1, graphics unit 150 is "directly coupled" to fabric 110 because there are no intervening elements.

Graphics unit 150 may include one or more processors and/or one or more graphics processing units (GPU's). Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes Unified Shading Cluster (USC) 160.

Display unit 165 may be configured to read data from a frame buffer and provide a stream of pixel values for display. Display unit 165 may be configured as a display pipeline in some embodiments. Additionally, display unit 165 may be configured to blend multiple frames to produce an output frame. Further, display unit 165 may include one or more interfaces (e.g., MIPI® or embedded display port (eDP)) for coupling to a user display (e.g., a touchscreen or an external display).

I/O bridge 170 may include various elements configured to implement: universal serial bus (USB) communications, security, audio, and/or low-power always-on functionality, for example. I/O bridge 170 may also include interfaces such as pulse-width modulation (PWM), general-purpose input/output (GPIO), serial peripheral interface (SPI), and/or inter-integrated circuit (I2C), for example. Various types of peripherals and devices may be coupled to device 100 via I/O bridge 170.

It is noted that the embodiment illustrated in FIG. 1 is merely an example. In other embodiments, different functional units (also referred to herein as "functional blocks"), and different configurations of functional blocks within device 100 are possible and contemplated.

Graphics Unit

Figure 2:
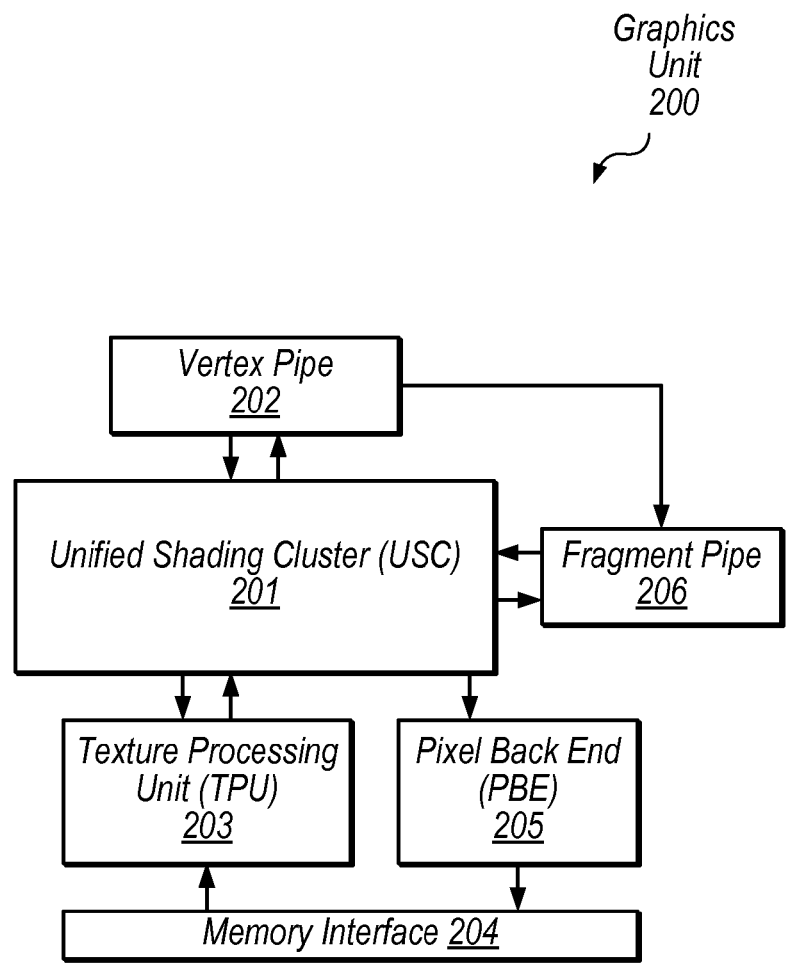
FIG. 2 illustrates an embodiment of a graphics unit.

Turning to FIG. 2, a simplified block diagram illustrating one embodiment of a graphics unit is shown. Graphics unit 200 may, in various embodiments, corresponding to graphics units 150 as depicted in FIG. 1. In the illustrated embodiment, graphics unit 200 includes unified shading cluster (USC) 201, vertex pipe 202, fragment pipe 206, texture processing unit (TPU) 203, pixel back end (PBE) 205, and memory interface 204. In one embodiment, graphics unit 200 may be configured to process both vertex and fragment data using USC 201, which may be configured to process graphics data in parallel using multiple execution pipelines or instances.

Vertex pipe 202, in the illustrated embodiment, may include various fixed-function hardware configured to process vertex data. Vertex pipe 202 may be configured to communicate with USC 201 in order to coordinate vertex processing. In the illustrated embodiment, vertex pipe 202 is configured to send processed data to fragment pipe 206 and/or USC 201 for further processing.

Fragment pipe 206, in the illustrated embodiment, may include various fixed-function hardware configured to process pixel data. Fragment pipe 206 may be configured to communicate with USC 201 in order to coordinate fragment processing. Fragment pipe 206 may be configured to perform rasterization on polygons from vertex pipe 202 and/or USC 201 to generate fragment data. Vertex pipe 202 and/or fragment pipe 206 may be coupled to memory interface 204 (coupling not shown) in order to access graphics data.

USC 201, in the illustrated embodiment, is configured to receive vertex data from vertex pipe 202 and fragment data from fragment pipe 206 and/or TPU 203. USC 201 may be configured to perform vertex processing tasks on vertex data which may include various transformations and/or adjustments of vertex data. USC 201, in the illustrated embodiment, may also be configured to perform fragment processing tasks on pixel data such as texturing and shading, for example. USC 201 may include multiple execution instances for processing data in parallel. USC 201 may be referred to as "unified" in the illustrated embodiment in the sense that it is configured to process both vertex and fragment data. In other embodiments, programmable shaders may be configured to process only vertex data or only fragment data.

TPU 203, in the illustrated embodiment, is configured to schedule fragment processing tasks from USC 201. In one embodiment, TPU 203 may be configured to pre-fetch texture data and assign initial colors to fragments for further processing by USC 201 (e.g., via memory interface 204).

TPU 203 may be configured to provide fragment components in normalized integer formats or floating-point formats, for example. In one embodiment, TPU 203 may be configured to provide fragments in groups of four (a "fragment quad") in a 2×2 format to be processed by a group of four execution instances in USC 201.

PBE 205, in the illustrated embodiment, is configured to store processed tiles of an image and may perform final operations to a rendered image before it is transferred to a frame buffer (e.g., in a system memory via memory interface 204). Memory interface 204 may facilitate communications with one or more of various memory hierarchies in various embodiments.

In various embodiments, a programmable shader such as USC 201 may be coupled in any of various appropriate configurations to other programmable and/or fixed-function elements in a graphics unit. The exemplary embodiment of FIG. 2 shows one possible configuration of a graphics unit 200 for illustrative purposes.

Unified Shading Cluster

Figure 3:
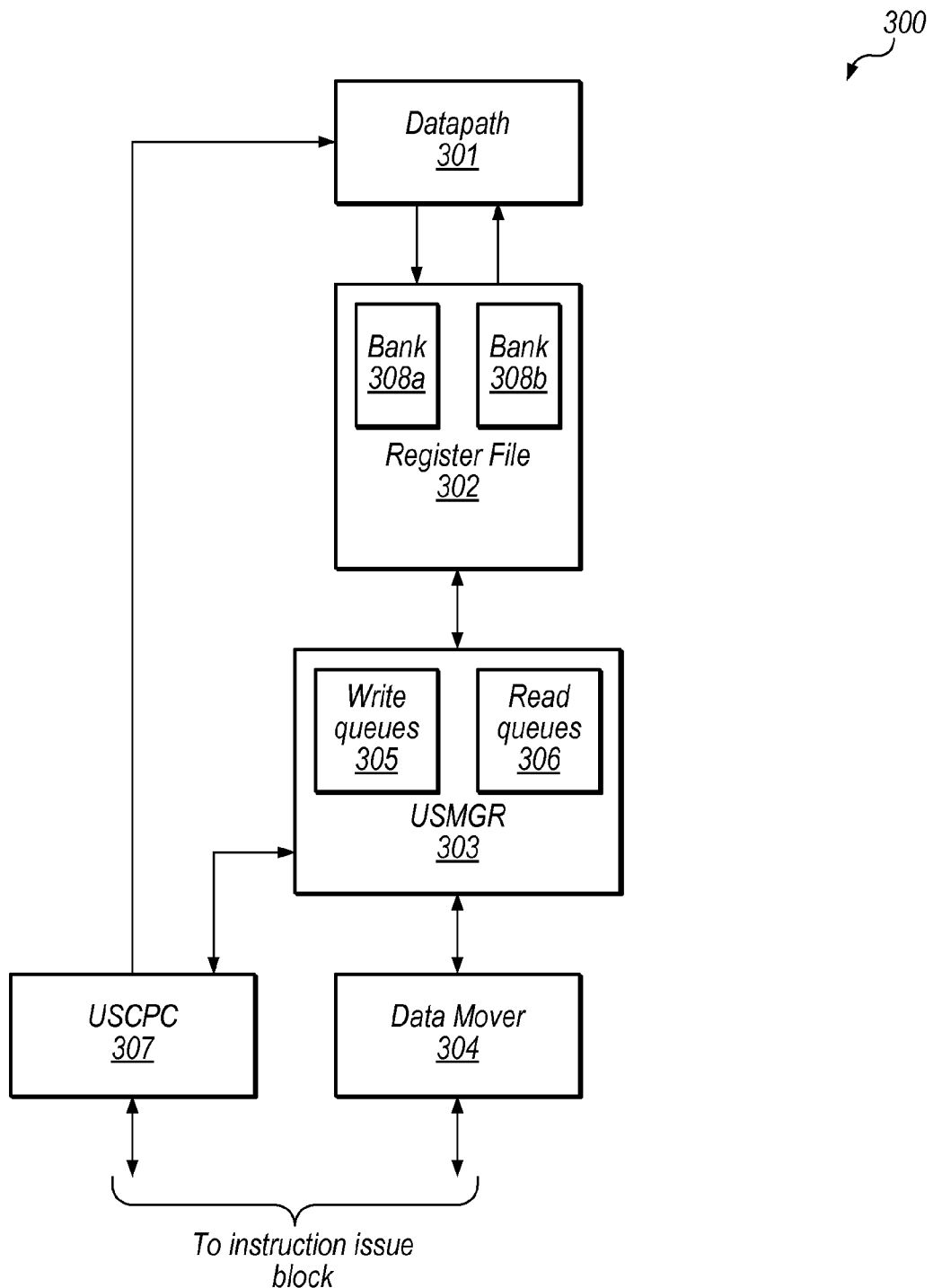
FIG. 3 illustrates an embodiment of a portion of a unified shading cluster.

An embodiment of a portion of a Unified Shading Cluster (USC) is illustrated in FIG. 3. It is noted, that for the purposes of clarity, some functional units have been omitted from USC 300. In various other embodiments, USC 300 may include additional functional units. USC 300 may, in various embodiments, correspond to USC 201 as illustrated in FIG. 2. The illustrated embodiment includes datapath 301, Register File 302, Unified Store Manager (USMGR) 303, Data Mover 304, and Unified Store Pipeline Controller (USCPC) 307.

Datapath 301 may include multiple logic circuits configured to perform operations on source operands retrieved from Register File 302. Upon completion of the operation, results may be written back into Register File 302. In various embodiments, multiple operations may be performed in parallel. In such cases, Datapath 301 may access data from different banks within Register File 302 in parallel.

Register File 302 may include multiple banks, such as, e.g., banks 308a and 308b. Although only two banks are depicted in the embodiment illustrated in FIG. 3, any suitable number of banks may be employed in other embodiments. Each bank may be operated independently, and may contain multiple data storage cells. In some embodiments the data storage cells may include both a read port and a write port allowing for parallel read and write access to a given data storage cell. In other embodiments, the data storage cells may include a single port through which a read or a write operation may be performed. It is noted that any suitable type of data storage cell may be employed. For example, in some embodiments, a Static Random Access Memory (SRAM) data storage cell may be employed.

During operation, Register File 302 may receive requests for read or write operations from both USMGR 303 as well as Datapath 301. In some embodiments, accesses, both read and write, from Datapath 301 may take priority over accesses from USMGR 303.

USMGR 303 includes write queues 305 and read queues 306 as well as additional control circuitry (not shown). In some embodiments, each write queue of write queues 305 may correspond to a respective bank of Register File 302, and each read queue may correspond to a respective bank of Register File 302. In other embodiments, each queue of write queues 305 and read queues 306 may store accesses for any bank of Register File 302. Writes queues 305 and read queues 306 may include multiple registers (one register per entry in the queue), with each register including multiple data storage cells coupled in parallel.

During operation, USMGR 303 may receive read and write requests from Data Mover 304. Each request may be targeted at a specific bank within Register File 302. As described below in more detail, write requests may include control bits which may indicate that a given write request is to be held, i.e., not written to Register File 302, in a write queue corresponding to the target bank in Register File 302. USMGR 303 may also send encoded information on the status of write queues 305 and read queues 306. Furthermore, USMGR 303 may also, in various embodiments, be configured to determine how often a given bank in Register File 302 is victimized, i.e., when USCPC accesses the given bank thereby preventing queue access to the given bank. As described in greater detail below, when a level of victimization meets or exceeds a threshold level, USMGR 303 may send a signal to USCPC 307 to hold further accesses, through Datapath 301, to a victimized bank in Register File 302.

Data Mover block 304 may include logic circuits and state machines collectively configured to receive and arbitrate requests from various agents within a graphics unit, such as, graphics unit 200 as illustrated in FIG. 2. For example, Data Mover block 304 may arbitrate requests from TPU 203 or PBE 205 as illustrated in FIG. 2. When arbitrate requests, Data Mover 304 may used queue status information received from USMGR 303 to select a next request to send to USMGR 303 for processing. Data Mover 304 may include control bits in write requests sent to USMGR 303 that indicate that data for a given write request may be needed shortly and should just be held in write queues 305.

USCPC 307 may also include assorted logic circuits and state machines configured to control operation of datapath 301 dependent upon instructions received from an instruction issue block. For example, USCPC 307 may receive instructions from Vertex Pipe 202 or Fragment Pipe 206. USCPC 307 may receive one or more signals from USMGR 303 indicating that accesses, via datapath 301, to a particular bank of Register File 302 should be halted. In some cases, accesses may be halted for multiple processing cycles, while USMGR 303 processes requests pending in write queues 305 and read queues 306. Once USMGR 303 has determined the particular bank is no longer being victimized, USCPC 307 may resume allow datapath 301 to resume accesses to Register File 302.

It is noted that the embodiment illustrated in FIG. 3 is merely an example. In other embodiments, different functional blocks and different configurations of functional blocks are possible and contemplated.

Figure 4:
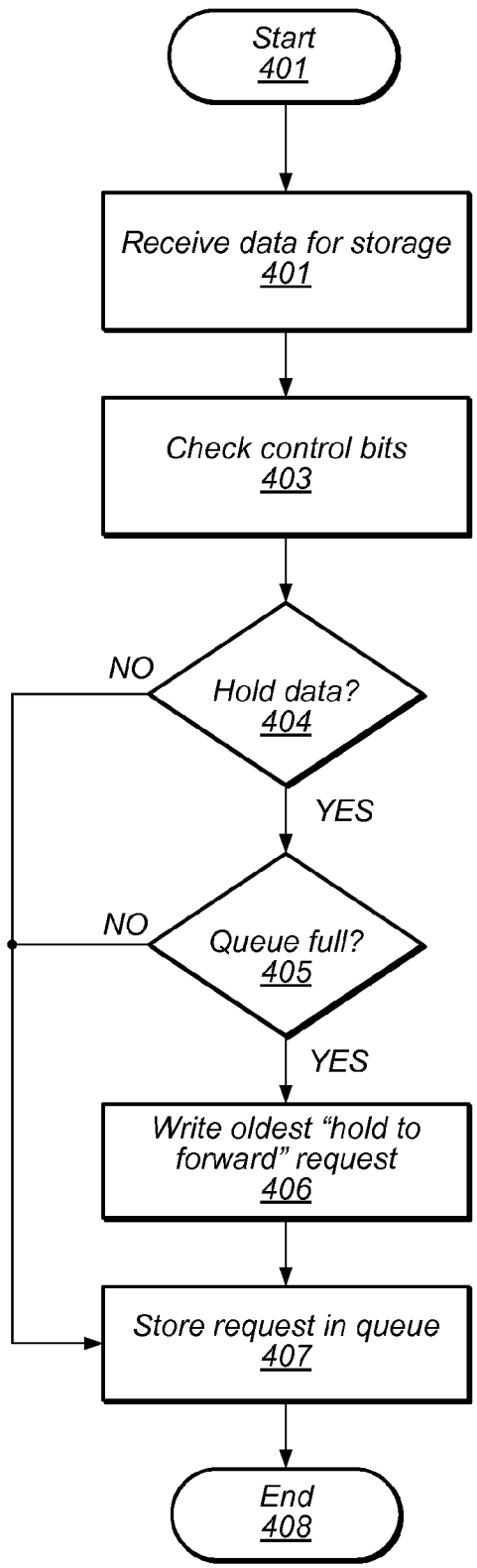
FIG. 4 depicts a flow diagram illustrating an example method for operating a portion of a unified shading cluster.

Referring to FIG. 4, a flow diagram depicting an embodiment of a method for writing non-datapath results to a register file. The method begins in block 401. Data may then be received for storage (block 402). In some embodiments, USMGR 303 may receive the data from Data Mover 304. The received data may include one or more control bits. The control bits may, in various embodiments, encode specialized instructions particular to the write request in which the data is included. Once the data is received, USMGR 303 may check the control bits (block 403). In some embodiments, a decoder may be employed if an encoding algorithm was used to generate the control bits.

The method may then depend on information encoded in the control bits, specifically if the received data is to be held (block 404). The control bits may be set to indicate to USMGR 303 that the data included in the write request may shortly be needed for another computation, and to save it in write queues 305. If the control bits indicate no special action is to be taken, the received data is placed in one of write queues 305 to be written into a corresponding bank of Register File 302 (block 407). Once the received write request has been placed in one of the write queues 305, the method may conclude in block 408.

If the control bits indicate the data is to be held (commonly referred to as "hold and forward"), then method may depend on the status of the target queue (block 405). If the target queue is not full, i.e., a number of pending transactions in the queue is less than a threshold value, then the method may proceed as described above from block 407. In some embodiments, when the received write request is placed in the queue, the write request is marked such that it is to be held as long as possible in the write queue. In some embodiments, a status bit, or other suitable indicator, may be set to indicate to USMGR 303 that the write request is not to be written to Register File 302. By holding data in the write queues of USMGR 303, USC 300 may, in various embodiments, reduce power consumption by allowing Data Mover 304 to read some data directly from write queues 305 instead of Register File 302.

If the target queue is, however, full, i.e., the number of pending transactions in the queue is greater than or equal to the threshold value, then an oldest hold and forward transaction may be selected and written to Register File 302 (block 406). In some embodiments, a counter, or other suitable circuitry may be used to track how long a given hold and forward transaction has been in the write queues of USMGR 303. A vector for each entry may, in some embodiments, be used to track entries older than a given entry. Upon writing a given hold and forward transaction to Register File 302, a corresponding counter or tracking circuit may be reset in preparation of a new transaction being loaded into the queue. Once the oldest hold and forward transaction has been written to Register File 302, an entry is available in the write queue for the received transaction to be stored. The method may then proceed from block 407 as described above.

The embodiment illustrated in FIG. 4 is merely an example. In various other embodiments, different numbers and types of rounding circuits may be employed.

Figure 5:
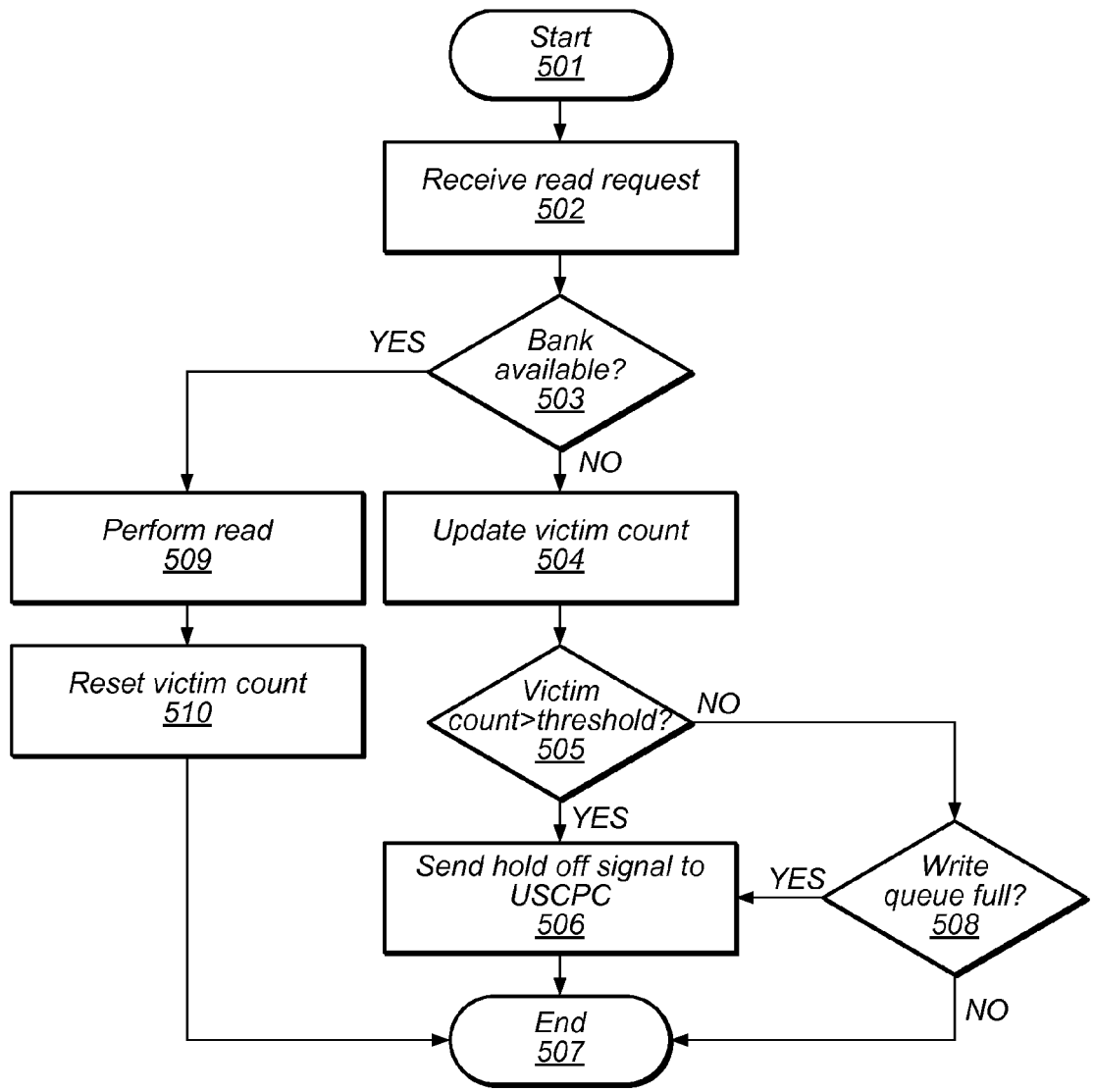
FIG. 5 depicts a flow diagram illustrating an embodiment of a method for detecting that a bank of a register is being victimized.

Turning to FIG. 5, a flow diagram illustrating an embodiment of a method for detecting that a bank of a register is being victimized is illustrated. Referring collectively to FIG. 3 and the flow diagram of FIG. 5, the method begins in block 501. A read request may then be received by USMGR 303 (block 502). In some embodiments, the read request may be received from Data Mover 304 which may gather requests from other instruction issue blocks, such as, texture processing unit 203 as illustrated in FIG. 2. The method may then depend on whether the target bank of the read request is available (block 503).

If the bank is unavailable due to a datapath access, the count indicating the number of times the target bank has been victimized, i.e., simultaneously accessed, is may be incremented (block 504). In some embodiments, Datapath 301 may be accessing the target bank when USMGR 303 attempts to read from the same bank. A counter, or other suitable circuit, may track a number of times such a conflict occurs. The number of conflicts may then be combined with a number of pending reads in the queue corresponding to the target bank to determine if the target bank has been overly victimized. If Datapath 301 continues to access the target bank, the received read request, along with other pending read requests, may not be able to complete. The method may then depend on the number of times the target bank has been victimized (block 505).

If the number of times the target bank has been victimized is greater than or equal to a threshold value, USMGR 303 may send a signal to USCPC 307 to hold further accesses to the target bank (block 506). USMGR 303 may indicate a number of cycles to halt accesses to the target bank. The number of cycles may, in various embodiments, dependent upon an amount of work than needs to be performed in the target bank. For example, if USMGR 303 has work to fill multiple cycles, then it may indicate to USCPC 307 to halt further accesses to the target bank for more than one cycle. In some embodiments, by halting accesses to Register File 302 by Datapath 301 dependent upon the work load, performance may be improved. Once the hold signal has been sent to USCPC 307, the method may conclude in block 507.

If number of times the target block has been victimized is less than the threshold value, the method may then depend on if a write queue associated with the target bank is full (block 508). If the number of entries in the write queue is greater than or equal a queue threshold value, then the hold signal may be sent and the method may proceed as described above from block 506. If, however, the number of entries in the write queue is less than the queue threshold value, then the method may conclude in block 507.

If the bank is available, USMGR 303 performs a read on the target bank of Register File 302 (block 309). USMGR 303 may send the retrieved data to Data Mover 304, which will, in turn, send the retrieved data onto the requesting agent. Once the read is complete, the victim count may then be reset (block 510) and the method may then conclude in block 507.

It is noted that the method depicted in the flowchart of FIG. 5 is merely an example. In other embodiments, different operations and different orders of operations are possible and contemplated.

Figure 6:
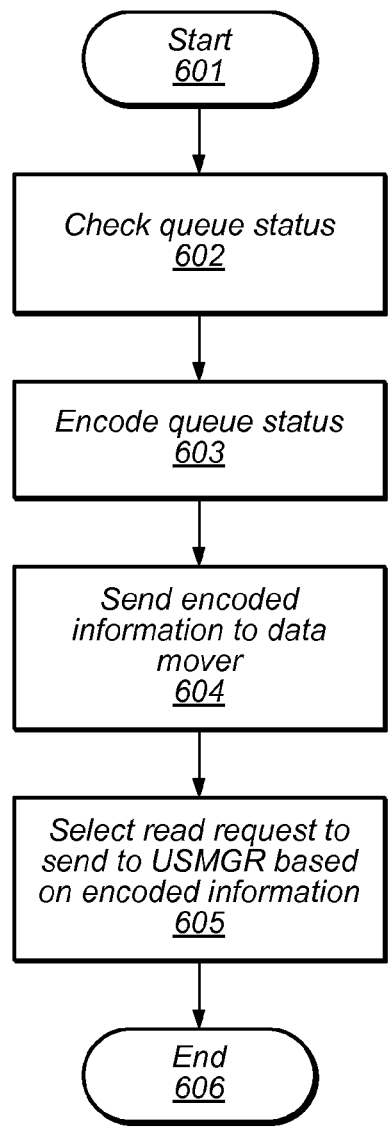
FIG. 6 depicts a flow diagram illustrating an embodiment of selecting read requests dependent on queue status information.

Referring now to FIG. 6, a flow diagram depicting an embodiment of a method of selecting read requests is illustrated. The method begins in block 601. The status of queues may then be checked (block 602). In various embodiments, USMGR 303 may check the status of read queues 306. A number of pending requests for each queue (both read and write) associated with a given bank within Register File 302 may be determined. Status bits associated with each queue entry, a counter, or any other suitable method may be used to determine the number of pending entries.

With the number of pending entries determined for each queue of read queues 306, a value may then be encoded for each queue (block 603). In various embodiments, different numbers of data bits and different encoding schemes may be employed. For example, two data bits may be used such that a the binary value 0x00 denotes no pending transactions, the binary value 0x01 denotes one pending transaction, the binary value 0x10 denotes two pending transactions, and the binary value 0x11 denotes three or more pending transactions.

USMGR 303 may then send the encoded information to Data Mover 304 (block 604). In various embodiments, different method may be employed to transfer the encoded information to Data Mover 304. For example, USMGR 303 may be directly coupled to Data Mover 304 via a dedicated interface, while, in other embodiments, USMGR 303 may be coupled to Data Mover 304 and USCPC 307 via a shared communication bus.

Data Mover 304 may then select a pending request to send to USMGR 303 dependent upon the encoded information (block 605). For example, Data Mover 304 has two requests that need to be sent to USMGR 303, Data Mover 304 may select to send a read request that is targeted at bank whose corresponding read queue has no pending read requests. With the selection of a request to send to USMGR 303, the method may conclude in block 606. By using the encoded information, USC 300 may, in various embodiments, make better use of available hardware resources.

Although the operations illustrated in FIG. 6 are depicted as being performed in a serial fashion, in other embodiments, one or more of the operations may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a first functional unit configured to send a write request, wherein the write request includes data to be stored, and wherein the data includes one or more control bits; and
   a second functional unit including a plurality of queues, a register file, wherein the register file includes a plurality of banks, and wherein the second functional unit is configured to:
   receive the write request;
   check the one or more control bits;
   hold the data in a given queue of the plurality of queues dependent upon the one or more control bits;
   determine an oldest entry of a subset of entries stored in the given queue responsive to a determination that a number of available entries in the queue is less than a threshold value, wherein the one or more control bits of each entry of the subset of entries indicate the data of each entry should be held in the queue;
   write the oldest entry of the subset of entries to the register file;
   receive a read request for a given bank of the plurality of banks;
   increment a victim count responsive to a determination the given bank of the plurality of banks is being accessed by a third functional unit and
   send a signal to the third functional unit responsive to a determination that a value of the victim count is greater than a threshold value, wherein the signal indicates to the third functional unit to hold further accesses to the given bank of the plurality of banks.

2. The apparatus of claim 1, wherein to hold the data in the given queue, the second functional unit is further configured to check a number of available entries in the given queue.

3. The apparatus of claim 1, wherein the second functional unit is further configured to:
   determine a status for each queue of the plurality of queues; and
   send the status of each queue of the plurality of queues to the first functional unit.

4. The apparatus of claim 3, wherein to send the status of each queue of the plurality of queues to the first functional unit, the second functional unit is further configured to encode a plurality of bits to indicate a number of pending transactions for each queue of the plurality of queues.

5. A method, comprising:
   receiving, from a first functional unit, by a second functional unit, data to be stored, wherein the data includes one or more control bits;
   checking the one or more control bits;
   holding the data in a given queue of a plurality of queues, dependent upon the one or more control bits;
   receiving, by the second functional unit, a read request data stored in a given bank of a plurality of banks, wherein each bank of the plurality of banks corresponds to a respective queue of the plurality of queues;
   incrementing a victim count responsive to determining that the given bank of the plurality of banks is currently being accessed by a third functional unit; and
   sending a signal to the third functional unit responsive to a determination that a value of the victim count is greater than a threshold value, wherein the signal indicates to the third functional unit to hold further accesses to the given bank of the plurality of bank.

6. The method of claim 5, wherein holding the data in the given queue comprises checking a number of available entries in the given queue.

7. The method of claim 6, further comprising:
   determining an oldest entry of a subset of entries stored in the given queue responsive to determining the number of available entries in the queue is less than a threshold value, wherein the one or more control bits of each entry of the subset entries indicate the data of each entry should be held in the queue; and
   writing the oldest entry of the subset of entries to a register file.

8. The method of claim 5, further comprising determining, by the second functional unit, a status each queue of the plurality of queues, and sending the status of each queue of the plurality of queues to the first functional unit.

9. The method of claim 8, wherein sending the status of each queue of the plurality of queues comprises encoding a plurality of bits to indicate a number of pending transactions for each queue of the plurality of queues.

10. The method of claim 8, further comprising selecting, by the first functional unit, a given read request of a plurality of pending read requests to send to the second functional unit dependent upon the status of each queue of the plurality of queues.

11. A system, comprising:
    a display; and
    a graphics unit including a first functional unit, a second functional unit, and a register file including a plurality of banks, wherein the graphics unit is configured to:
    send a write request from the first functional unit to the second functional unit, wherein the write request includes data to be stored, and wherein the data includes one or more control bits;
check the one or more control bits;
hold the data in a given queue of a plurality of queues dependent upon the one or more control bits;
determine an oldest entry of a subset of entries stored in the given queue responsive to a determination a number of available entries in the queue is less than a threshold value, wherein the one or more control bits of each entry of the subset entries indicate the data of each entry should be held in the queue;
write the oldest entry of the subset of entries to the register file;
receive a read request for a given bank of the plurality of banks;
increment a victim count responsive to a determination the given bank of the plurality of banks is being accessed by a third functional unit; and
send a signal to the third functional unit responsive to a determination that a value of the victim count is greater than a threshold value, wherein the signal indicates to the third functional unit to hold further accesses to the given bank of the plurality of banks.

12. The system of claim 11, wherein to hold the data in the given queue, the graphics unit is further configured to check a number of available entries in the given queue.

13. The system of claim 11, wherein the graphics unit is further configured to determine a status of each queue of the plurality of queues.

14. The system of claim 13, wherein to determine the status of each queue of the plurality of queues, the graphics units is further configured to encode a plurality of bits to indicate a number of pending transactions for each queue of the plurality of queues.

* * * * *